United States Patent

[11] 3,608,751

| [72] | Inventor | Virgil A. Hundtofte<br>Omaha, Nebr. |
|---|---|---|
| [21] | Appl. No. | 17,097 |
| [22] | Filed | Mar. 6, 1970 |
| [45] | Patented | Sept. 28, 1971 |
| [73] | Assignee | Allied Chemical Corporation<br>New York, N.Y. |

[54] DEVICE AND METHOD FOR LOADING OF VERTICAL CATALYST TUBES
14 Claims, 2 Drawing Figs.

[52] U.S. Cl. .................................................. 214/17 C,
193/32, 214/152
[51] Int. Cl. ..................................................... B65g 65/32
[50] Field of Search .......................................... 214/17 C,
152; 193/32

[56] References Cited
UNITED STATES PATENTS
1,676,691  7/1928  Fresk .............................. 214/17 C
FOREIGN PATENTS
313,168  7/1930  Great Britain ................ 193/32

*Primary Examiner*—Robert G. Sheridan
*Attorneys*—Fred L. Kelly and Patrick L. Henry ABSTRACT: A device and method for facilitating dry loading of a particulate catalyst into vertical catalyst tubes. The loading device includes an elongated member such as a Manila line having inclined blades mounted thereon at selected spaced intervals. The elongated member is held vertically in the catalyst tube during the loading of the catalyst whereupon the blades function to cushion and retard the speed of the catalyst, the elongated member being removed therefrom in timed relation to the loading. With use of the device, catalyst breakage is greatly minimized.

PATENTED SEP 28 1971
3,608,751
FIG. 1
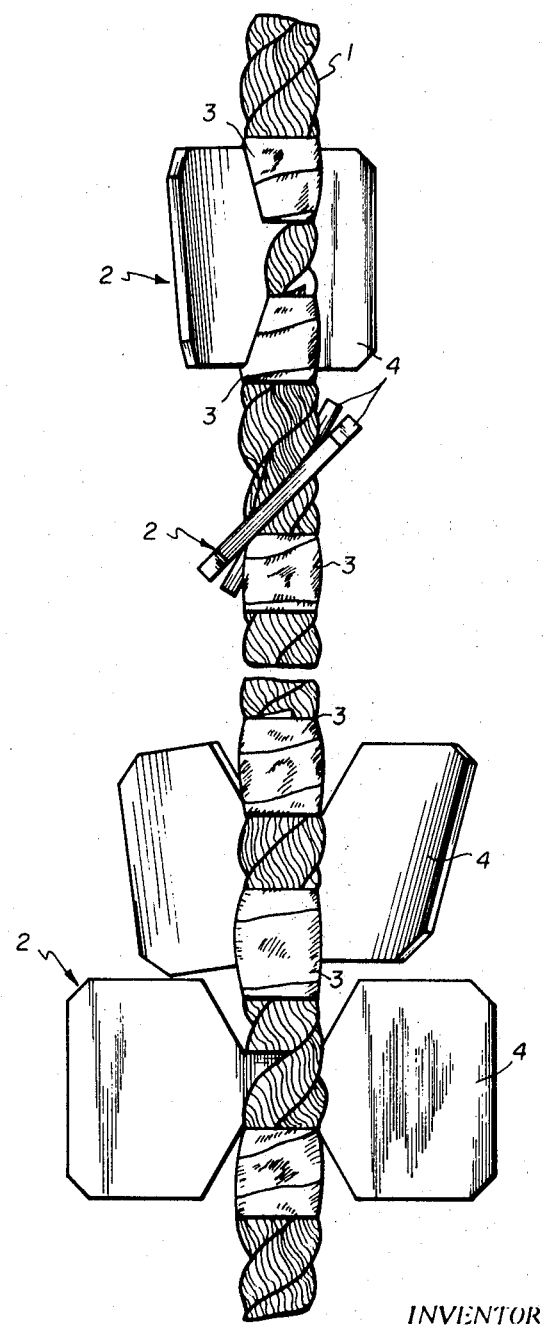
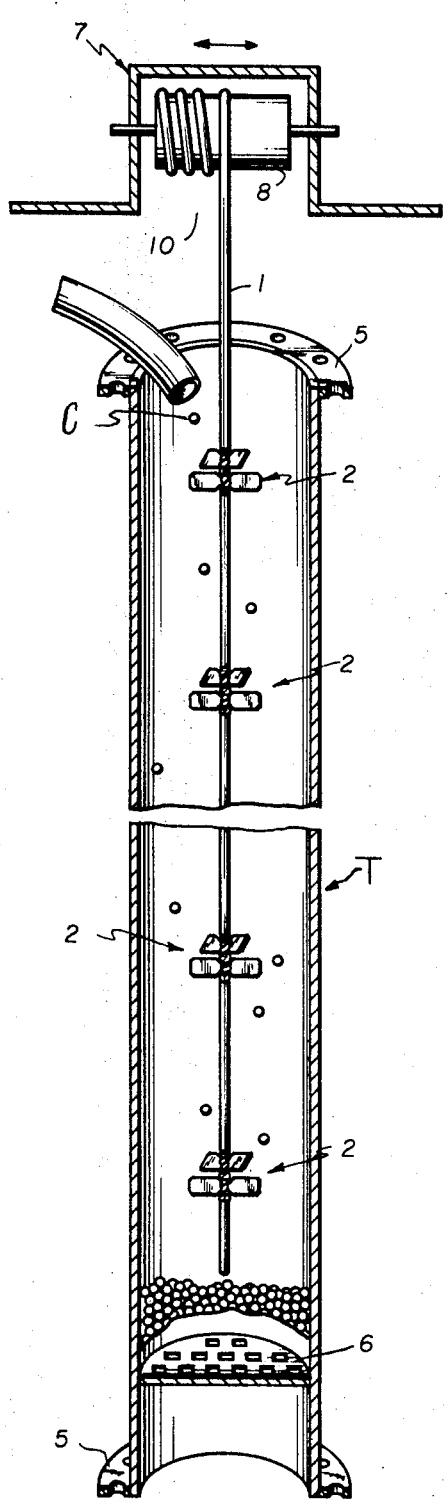
FIG. 2
INVENTOR.
VIRGIL A. HUNDTOFTE
BY *J. J. Lipson*
ATTORNEY

DEVICE AND METHOD FOR LOADING OF VERTICAL CATALYST TUBES

BACKGROUND OF THE INVENTION

This invention relates to charging a particulate catalyst into a vertical catalyst tube.

Several methods have been developed to minimize difficulties associated with catalyst loading techniques. Wet loading methods have been used to reduce catalyst breakage over dry loading methods but tend to cause "bridging" of the catalyst so that vacant spaces are present in the packing. A more satisfactory but time consuming procedure is the so-called "sock" loading method wherein a particulate catalyst is placed into a plastic or canvas sleeve or sock which is lowered into the catalyst tube. About 1.3 man-hours per catalyst tube is required for loading with the use of the "sock" method. Because no known charging procedure is entirely satisfactory, extensive efforts have been made to develop a simple dry loading method that will result in reduced loading time and only minor breakage of catalyst.

SUMMARY OF THE INVENTION

The present invention relates to a catalyst loading device and a method of loading a particulate catalyst into a vertical catalyst tube. Broadly, the method includes:

a. providing means forming an elongated member held vertically in the catalyst tube, said elongated member having a multiplicity of inclined blades mounted thereon at preselected spaced intervals;

b. locating the leading end of the elongated member near the bottom end of the tube;

c. introducing the particulate catalyst into the top of the catalyst tube so that it falls downward in the tube, said fall being cushioned and retarded by the multiplicity of inclined blades supported by the elongated member;

d. maintaining velocity of the catalyst particles in the catalyst tube sufficiently low for minimizing catalyst breakage to form a uniform bed of catalyst in the tube; and e. removing the elongated member from the catalyst tube in timed relation to the catalyst loading.

Broadly, the catalyst loading device, in combination with a vertical catalyst tube, comprises:

a. an elongated member having a length which is at lease equal to the height of the catalyst tube;

b. a multiplicity of inclined blades mounted on the elongated member at preselected spaced intervals;

c. means for locating and holding the elongated member vertically in the catalyst tube; and d. means responsive to a loading of catalyst into the catalyst tube for removing the elongated member from the catalyst tube in timed relation to said loading.

DESCRIPTION OF THE DRAWINGS

FIG. 1 is a schematic view of part of a catalyst loading device illustrative of a preferred embodiment of the invention.

FIG. 2 is a partial sectional and schematic view of the catalyst loading device shown in combination with a vertical catalyst tube.

PREFERRED EMBODIMENT OF THE INVENTION

In accordance with one preferred embodiment of the invention, a vertical catalyst tube having a diameter of about 3 to 5 inches and a height of about 30 to 40 feet is loaded with a particulate catalyst having a diameter of about 0.5 to 1.0 inches. The method involves providing an elongated member, preferably a flexible line such as Manila line, held vertically in the catalyst tube, said line having a diameter of about 0.5 inch and a length at least as great as the height of the catalyst tube. The line is provided with a multiplicity of inclined blades fixedly mounted on the line at an inclination of about 45° to the axis of the line. Preferably, the inclined blades are mounted on the line in adjacent pairs having an angle of 60° to 90° to each other, and the pairs of blades are mounted on the line at intervals of 2 to 3 feet so that they define a downward circuitous path within the catalyst tube.

The particulate catalyst is introduced into the top of the catalyst tube by conventional means, and the catalyst falls by gravity down the catalyst tube, the fall being cushioned and slowed by the multiplicity of inclined blades supported by the flexible line. The velocity of the catalyst particles is normally maintained at a velocity less than 8 feet per second by the inclined blades. Catalyst breakage is less than 1 percent in the fall down the catalyst tube so that a uniform bed of catalyst is formed in the tube.

During the loading of the catalyst, the flexible line is progressively retracted from the catalyst tube in timed relation to the loading of the tube. Since the rate of retraction is proportional to the rate of addition of catalyst, the blades mounted on the line are thereby maintained above the bed of catalyst formed in the catalyst tube.

FIG. 1 is a schematic view of part of a catalyst loading device illustrative of a preferred embodiment of the invention. With reference to FIG. 1, an elongated member 1, preferably a flexible line such as Manila line, is provided with inclined blades 2 which are mounted perpendicular to the line by insertion through strands of the line, as shown, or by other suitable means. The blades are securely mounted in place on the line, for example by means of wire or friction tape 3 wrapped about the line at opposite sides of each inserted blade. The blades normally have a flat surface 4 but, alternatively may have a shaped surface similar to that found in a screw type propeller. Preferably the blades are constructed of a resilient material, such as a fluorocarbon resin, available commercially under the trademark "Teflon." The inclined blades are mounted on the line at intervals no greater than about 3 feet. Preferably, the blades are mounted on the line in adjacent pairs having an angle of 60° to 90° to each other, and the pairs of blades are mounted on the line at intervals of 2 to 3 feet. The blades are sized to fit loosely within the catalyst tube. Normal inclination of the blades is about 30° to 45°, preferably about 45°, to the axis of the line.

FIG. 2 is a partial sectional and schematic view of the catalyst loading device, hereinbefore described, shown in combination with a vertical catalyst tube T. The catalyst tube T is of the conventional type and arranged for loading with catalyst C. The catalyst tube is provided with conventional flanges 5 located on opposing ends of the tubes for attachment to other equipment (not shown). A grate 6, or other suitable means for supporting the catalyst, is of the conventional type and located near the bottom end of the tube.

A unit 7 for feeding and retracting the line is located above the catalyst tube T. The unit 7 is driven by conventional means (not shown) in a reciprocating linear movement for unwinding and winding the line about a roller, 9, the unwinding occurring when the line is being located in the tube prior to feeding and the winding occurring during retraction of the line during feeding. The unit 7 is provided with a centrally located opening 10 for passage of the line therethrough, said opening 10 being constantly aligned with the tube, due to the reciprocating movement, so that the feed line preferably extends along the central axis of the tube. It is understood, however, that while an automatic roller unit has been described, the line could be fed into and removed from the tube manually, the only essential requirement being that the line be retracted in timed relationship with the feed of the catalyst beads.

When the loading device is in position in the catalyst tube, the line extends substantially along the central axis of the tube, the bottom end of the line is located near or at the bottom of the tube, and the inclined blades define a downward circuitous path within the catalyst tube. As the particulate catalyst is introduced into the top of the tube, the fall of each particle is interrupted at intervals of a few feet by striking an inclined blade which cushions and slows the fall. The maximum velocity of each particle is therefore much less than in free fall in the catalyst tube, because of the acceleration to a freely falling body due to the attraction of gravity. Moreover, it has been demonstrated, in examples shown hereinafter, that a series of relatively short falls onto inclined blades in the instant method results in significantly less catalyst breakage than free fall over an equal distance in an empty catalyst tube.

One unexpected advantage of the instant invention is the relatively uniform and greatly reduced pressure drop or "delta pressure" observed in catalyst tubes loaded in accordance with the instant invention. A pressure drop as low as one-half of design value has been noted. This advantage is attributed in part to reduced catalyst breakage; however, other factors such as distribution of the catalyst packing may also be important. Those skilled in the art will appreciate the important advantages relative to the cost of plant operation that stem from uniform pressure in catalyst tubes and reduced pressure drop through the bed of catalyst.

The following examples are provided to more fully illustrate the instant invention. They are provided for illustrative purposes only and are not to be construed as limiting the scope of the invention, which is defined by the appended claims.

EXAMPLE I

The catalyst loading device used in this example was constructed, as indicated in FIG. 1, using half-inch diameter Manila line and inclined blades made from a fluorocarbon resin sold under the trademark "Teflon." For convenience, this loading device will hereinafter be called a bladed-line device. The blades were positioned on the line in adjacent pairs at about a 60° angle to one another, with pairs of blades at about 2.5-foot intervals on the line. The blades were inserted through strands of the Manila line and held firmly in place by friction tape around the line above and below the blades. The blades were about 3 inches from tip to tip and were normally inclined about 30°–45° from the axis of the line by the slant of the strands of the Manila line. The bladed-line device when used for loading catalyst was held in a vertical position in the center of the catalyst tube.

In an ammonia plant, several gas reformer catalyst tubes having a height of about 34 feet were loaded with a typical reformer catalyst. The following procedures were used in order to make a comparative evaluation of the bladed-line device:

A. Free-fall Loading Procedure

The catalyst was poured into the vertical catalyst tube and allowed to fall freely.

B. Manila-Line Loading Procedure

A Manila line was held in the vertical catalyst tube, catalyst was poured in, and the Manila line was raised as the level of catalyst in the tube increased.

C. Bladed-Line Procedure

The bladed-line device was held in the vertical catalyst tube, catalyst was poured in, and the line was raised as the level of catalyst in the tube increased.

The data in table 1 were taken in a series of tests wherein a relatively small proportion of a catalyst support material was added to each catalyst tube prior to addition of the catalyst charge. The data shown the bladed-line procedure resulted in significantly less breakage than the other two procedures tested.

TABLE I

SUMMARY OF CATALYST LOADING DATA

A. Free-Fall Procedure

|  | Support Charge | Catalyst Charge | Total Charge |
|---|---|---|---|
| Weight, ounces | 68.00 | 557.75 | 625.75 |
| Weight broken pieces, oz. | 12.75 | 18.75 | 31.50 |
| Percent broken pieces | 18.75 | 3.36 | 5.03 |

B. Plain Manila-Line Procedure

|  | Support Charge | Catalyst Charge | Total Charge |
|---|---|---|---|
| Weight, ounces | 61.75 | 591.50 | 653.25 |
| Weight broken pieces, oz. | 4.00 | 10.25 | 14.25 |
| Percent broken pieces | 6.48 | 1.73 | 2.18 |

C. Bladed-line Procedure

|  | Support Charge | Catalyst Charge | Total Charge |
|---|---|---|---|
| Weight, ounces | 65.50 | 538.50 | 604.00 |
| Weight broken pieces, oz. | 0.50 | 4.75 | 5.25 |
| Percent broken pieces | 0.76 | 0.88 | 0.87 |

EXAMPLE II

In further testing with the bladed-line procedure of example I, 144 reformer catalyst tubes were loaded. Loading time averaged about 0.5 man-hours per catalyst tube. Pressure differential in the loaded catalyst tubes average 10.1 pounds per square inch, with 89 percent of the tubes within 5 percent of the average, and 100 percent of the tubes within 10 percent of the average.

Such relatively uniform pressure differential in the tubes is desirable in plant operation in order to obtain a uniform flow of gas through each tube when a given gas pressure is applied to all of the tubes.

I claim:

1. A method of loading a particulate catalyst into a vertical catalyst tube, which comprises:
   a. providing means forming an elongated member held vertically in the catalyst tube, said elongated member having a multiplicity of inclined blades mounted thereon at preselected spaced intervals;
   b. locating the leading end of the elongated member near the bottom end of the tube;
   c. introducing the particulate catalyst into the top of the catalyst tube so that it falls downward in the tube, said fall being cushioned and retarded by the multiplicity of inclined blades supported by the elongated member;
   d. maintaining velocity of the catalyst particles in the catalyst tube sufficiently low for minimizing catalyst breakage, to form a uniform bed of catalyst in the tube; and
   e. removing the elongated member from the catalyst tube in timed relation to the catalyst loading.

2. The method as claimed in claim 1 wherein the providing means forming an elongated member is a flexible line, and the catalyst breakage is less than 1 percent of the total catalyst introduced.

3. The method as claimed in claim 2 wherein the blades are located at intervals no greater than about 3 feet.

4. The method as claimed in claim 2 wherein the inclined blades are mounted on the line in adjacent pairs having an angle of 60° to 90° to each other, said pairs of blades being mounted on the line at intervals of 2 to 3 feet.

5. The method as claimed in claim 2 wherein the velocity of the catalyst particles in the catalyst tube is maintained at a velocity less than 8 feet per second.

6. The method as claimed in claim 2 wherein the blades are inclined to the axis of the line at an angle of about 45°.

7. The method as claimed in claim 2 wherein the line is a Manila line having a diameter of about 0.5 inch, the inclined blades are constructed of a resilient fluorocarbon resin, and the catalyst tube has a height of about 30 to 40 feet.

8. In combination with a vertical catalyst tube of the type wherein a particulate catalyst is loaded into the top of the catalyst tube, a device to facilitate loading of the catalyst, which comprises:
   a. an elongated member having a length which is at least equal to the height of the catalyst tube;

b. a multiplicity of inclined blades mounted on the elongated member at preselected spaced intervals;
c. means for locating and holding the elongated member vertically in the catalyst tube; and
d. means responsive to a loading of catalyst into the catalyst tube for removing the elongated member from the catalyst tube in timed relation to said loading.

9. The device as claimed in claim 8 wherein the elongated member is a flexible line.

10. The device as claimed in claim 9 wherein the blades are located at intervals no greater than about 3 feet.

11. The device as claimed in claim 9 wherein the blades are mounted on the flexible line in adjacent pairs having an angle of 60° to 90° to each other, said pairs of blades being mounted on the line at intervals of 2 to 3 feet and forming a downward circuitous path.

12. The device as claimed in claim 9 wherein the blades are inclined to the axis of the line at an angle of about 45°.

13. The device as claimed in claim 9 wherein the line is a Manila line and the inclined blades are securely held between strands of said line.

14. The device as claimed in claim 9 wherein the blades are constructed of a resilient fluorocarbon resin.